(12) United States Patent
Shin et al.

(10) Patent No.: US 10,521,976 B2
(45) Date of Patent: Dec. 31, 2019

(54) VEHICLE DATA COLLECTION DEVICE AND METHOD THEREOF

(71) Applicants: HYUNDAI MOTOR COMPANY, Seoul (KR); KIA MOTORS CORPORATION, Seoul (KR)

(72) Inventors: Dong Jin Shin, Suwon-si (KR); Dong Youl Lee, Seoul (KR); Jae Am Seo, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 152 days.

(21) Appl. No.: 15/817,596

(22) Filed: Nov. 20, 2017

(65) Prior Publication Data
US 2019/0080526 A1    Mar. 14, 2019

(30) Foreign Application Priority Data
Sep. 12, 2017  (KR) .......................... 10-2017-0116473

(51) Int. Cl.
*G07C 5/00*  (2006.01)
*G07C 5/08*  (2006.01)
*H04L 12/40*  (2006.01)
*H04L 29/08*  (2006.01)

(52) U.S. Cl.
CPC .............. *G07C 5/008* (2013.01); *G07C 5/085* (2013.01); *H04L 67/12* (2013.01); *H04L 2012/40215* (2013.01)

(58) Field of Classification Search
CPC ......... G07C 5/008; G07C 5/085; H04L 12/40; H04L 67/12
USPC ....................................................... 701/31.4
See application file for complete search history.

(56) References Cited

U.S. PATENT DOCUMENTS

| | | | | |
|---|---|---|---|---|
| 2005/0203673 | A1* | 9/2005 | El-Hajj | G06Q 10/08 701/1 |
| 2016/0196132 | A1* | 7/2016 | Searle | H04L 41/082 717/173 |
| 2016/0294605 | A1* | 10/2016 | Searle | H04L 41/082 |
| 2016/0359740 | A1* | 12/2016 | Parandehgheibi | H04L 63/1425 |
| 2017/0149900 | A1* | 5/2017 | Moriguchi | H04L 12/66 |

FOREIGN PATENT DOCUMENTS

KR    100484484 B1    4/2005
KR    101439018 B1    9/2014

* cited by examiner

*Primary Examiner* — Yazan A Soofi
(74) *Attorney, Agent, or Firm* — Brinks Gilson & Lione

(57) ABSTRACT

The present disclosure relates to a vehicle data collection device and a method thereof. The vehicle data collection device includes: a data receiver configured to receive vehicle data through a vehicle network; a data collector configured to collect the vehicle data based on a collection information table and a collection status table; a storage configured to store the vehicle data; a controller configured to set a field value in the collection information table, and update the collection status table when the data collector collects the vehicle data and when the vehicle table is transmitted; and a transmitter configured to transmit the vehicle data to a head unit.

18 Claims, 5 Drawing Sheets

| DATA (byte) 4 8 12 16 20 24 28 32 | REDUNDANT CODE | DATA TRANSMISSION TRAFFIC |
|---|---|---|
| (OVERLAPPING OF ALL SEGMENTS) | 0 | 0 |
| (FIRST 16 BYTES OVERLAPPING) | 1 | 16 |
| (LAST 16 BYTES OVERLAPPING) | 2 | 16 |
| | 3 | 24 |
| | 4 | 24 |
| | 5 | 24 |
| | 6 | 24 |
| | 7 | 28 |
| | 8 | 28 |
| | 9 | 28 |
| | 10 | 28 |
| | 11 | 28 |
| | 12 | 28 |
| | 13 | 28 |
| | 14 | 28 |
| (NON-OVERLAPPING OF ALL SEGMENTS) | 15 | 32 |

FIG.4

VEHICLE DATA COLLECTION DEVICE AND METHOD THEREOF

CROSS-REFERENCE TO RELATED APPLICATION

The present application claims priority to and the benefit of Korean Patent Application No. 10-2017-0116473, filed on Sep. 12, 2017, which is incorporated herein by reference in its entirety.

FIELD

The present disclosure relates to a vehicle data collection device and a method thereof and, more particularly, to a technology for efficiently collecting vehicle data per a collection policy of a user that is selected among vehicle data periodically received from each vehicle controller through a vehicle network.

BACKGROUND

The statements in this section merely provide background information related to the present disclosure and may not constitute prior art.

In recent years, a technology for collecting various types of vehicle data (sensor data, control data, network data, and the like) generated according to operations of vehicles in real time is being developed, for the purpose of using the collected data in quality improvement of vehicles, differentiation of new vehicles, and various convenience services (public service and personalized service).

Since such vehicle data includes various control information and tuning information and is generated at a short time interval of 10 to 100 ms, it is reasonable to collect data selectively according to the purpose of use rather than to collect full set of data, unless it is absolutely necessary.

In the related art, a special collection method (specific filtering) was not required because a head unit of a vehicle having a high performance central processing unit (CPU) and a large capacity memory collected vehicle data.

However, collecting, by a gateway of a vehicle network rather than the head unit of the vehicle, the vehicle data is efficient in terms of reducing loads on the vehicle network and the head unit. Accordingly, a method for collecting, by the gateway, the vehicle data selectively has been proposed. However, since the gateway has a low performance CPU and a small capacity memory, the proposed method may be difficult to collect the vehicle data.

SUMMARY

An aspect of the present disclosure provides a vehicle data collection device and method capable of collecting each vehicle data set by a user. The vehicle data may be received from each vehicle controller through a vehicle network within a corresponding period (collection period set for each vehicle data). The vehicle collection device and method are also capable of recording whether or not each vehicle data is collected in real time, thereby preventing overlapping collection of the vehicle data within the corresponding period.

In one aspect of the present disclosure, a vehicle data collection device may include: a data receiver configured to receive vehicle data through a vehicle network; a data collector configured to collect the vehicle data based on a collection information table and a collection status table; a storage configured to store the vehicle data; a controller configured to set a field value in the collection information table, and update the collection status table when the data collector collects the vehicle data and when the vehicle table is transmitted; and a transmitter configured to transmit the vehicle data to a head unit.

The data collector may collect a Controller Area Network (CAN) message corresponding to a CAN ID recorded in the collection information table for a collection period.

The data collector may check with a binary search method whether a CAN message including the vehicle data corresponds to a CAN message in the collection information table.

The data collector may determine whether to collect the CAN message based on the collection status table.

The controller may change the field value regarding a CAN ID and a collection period in the collection information table at a user's request.

The controller may record "O" in a collection status field of the collection status table when the data collector collects the vehicle data, and record "X" in the collection status field of the collection status table when the vehicle data is transmitted to the head unit. Here, "O" indicates that it is not required to collect the vehicle data since the vehicle data has already been collected, and "X" indicates that it is required to collect the vehicle data since the vehicle data has not been collected.

The controller may control the transmitter to transmit the vehicle data based on an overlapping code table.

The overlapping code table may include an overlapping segment between vehicle data collected in a previous period and vehicle data collected in a current period, and an overlapping code corresponding to each overlapping segment.

The controller may control the transmitter to transmit vehicle data except for the overlapping segment, and transmit the overlapping code.

The storage may store the vehicle data for each collection period.

In another aspect of the present disclosure, a vehicle data collection method may include: receiving vehicle data through a vehicle network; collecting the vehicle data based on a collection information table and a collection status table; storing the vehicle data; transmitting the vehicle data to a head unit; setting a field value in the collection information table; and updating the collection status table when a data collector collects the vehicle data and when the vehicle table is transmitted to the head unit.

Collecting the vehicle data based on the collection information table and the collection status table may include collecting a CAN message corresponding to a CAN ID recorded in the collection information table for a collection period.

Collecting the vehicle data based on the collection information table and the collection status table may include checking with a binary search method whether a CAN message including the vehicle data corresponds to a CAN message in the collection information table.

Collecting the vehicle data based on the collection information table and the collection status table may include determining whether to collect the CAN message based on the collection status table.

Setting the field value in the collection information table may include changing the field value regarding a CAN ID and a collection period in the collection information table at a user's request.

Updating the collection status table may include recording "O" in a collection status field of the collection status table when the data collector collects the vehicle data, and recording "X" in the collection status field of the collection status table when vehicle data is transmitted to the head unit.

Transmitting the vehicle data to the head unit may include transmitting the vehicle data based on an overlapping code table.

The overlapping code table may include an overlapping segment between vehicle data collected in a previous period and vehicle data collected in a current period, and an overlapping code corresponding to each overlapping segment.

Transmitting the vehicle data to the head unit may include transmitting vehicle data except for the overlapping segment, and transmitting the overlapping code.

Storing the vehicle data may include storing the vehicle data for each collection period.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 illustrates an overlapping code table; and

Figure 1:
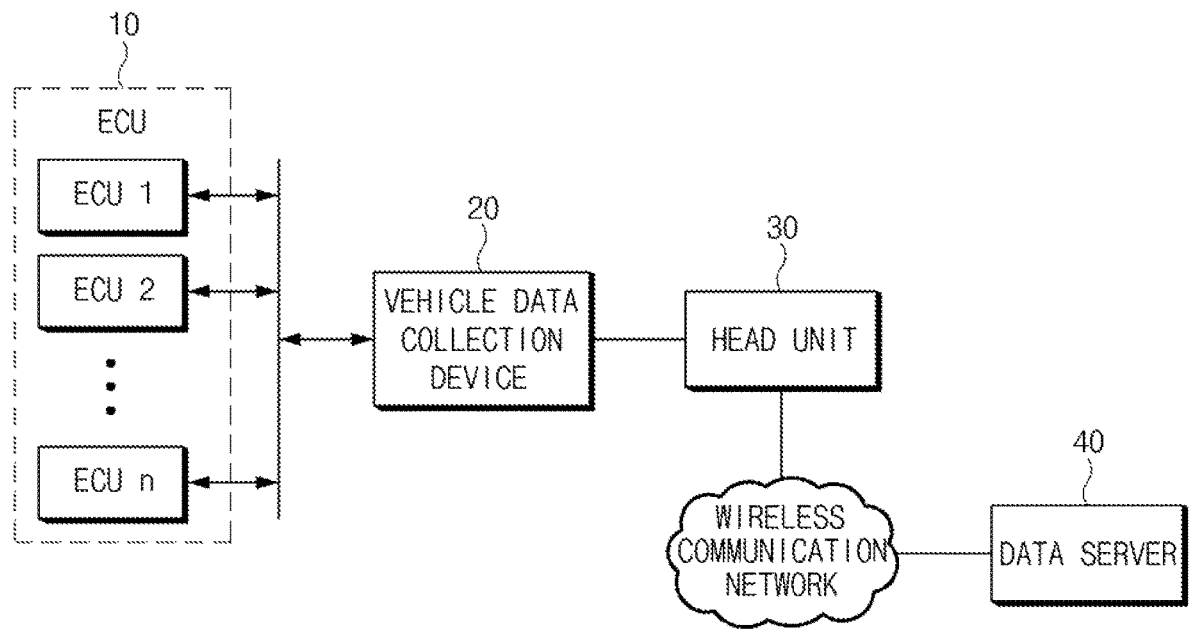
FIG. 1 illustrates the configuration of a vehicle data collection system to which a vehicle data collection device is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In addition, a detailed description of well-known techniques associated with the present disclosure will be ruled out in order not to unnecessarily obscure the gist of the present disclosure.

Terms such as first, second, A, B, (a), and (b) may be used to describe the elements in some forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates the configuration of a vehicle data collection system to which a vehicle data collection device is applied.

As illustrated in FIG. 1, the vehicle data collection system may include an electronic control unit (ECU), a vehicle data collection device 20, a head unit 30, and a data server 40. Here, the vehicle data collection device 20 may be mounted on a gateway of a vehicle network. The vehicle network may include a controller area network (CAN), a local interconnect network (LIN), FlexRay, media oriented systems transport (MOST), and the like.

With regard to each of the aforementioned elements, the ECU 10 may include a plurality of ECUs ECU 1, ECU 2, . . . , ECU n, each of which controls a function of a corresponding vehicle system and generates corresponding vehicle data. For example, ECU 1 may be a controller for vehicle engine system, ECU 2 may be a controller for vehicle transmission system, and ECU n may be a controller for vehicle steering wheel. Here, the vehicle data may be a CAN message format, and include a status value, a status change value, an output signal value, and the like of the corresponding system.

The vehicle data collection device 20, in some forms of the present disclosure, may collect each vehicle data set by a user among vehicle data received from the ECU 10 through the vehicle network within a corresponding period (collection period set for each vehicle data), record whether or not each vehicle data is collected in real time, and prevent overlapping collection of the vehicle data within the corresponding period.

The vehicle data collection device 20 may be provided with a first memory in which a collection information table (first table) is stored. Here, each field of the collection information table may be arbitrarily set by the user.

Here, the first memory may include at least one storage medium selected from among a flash memory, a hard disk, a solid status disk (SSD), a silicon disk drive (SDD), a multimedia card micro type memory, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk, but may preferably be a non-volatile memory in which information is not erased even when power is turned off.

For example, the collection information table may be illustrated as table 1 below.

TABLE 1

| CAN ID | 0x101 | 0x2AB | 0x3EF | . . . | . . . |
|---|---|---|---|---|---|
| RAM Index | 1 | 2 | 3 | 4 | 5 |
| Collection Period | 100 ms | 1 sec | 1 min | . . . | . . . |

In table 1, "CAN ID" indicates an identifier of a CAN message including vehicle data to be collected. Here, the CAN IDs may be arranged in ascending or descending order to improve matching efficiency. In other words, the CAN IDs may be arranged in ascending or descending order to improve efficiency of a process of verifying whether or not a CAN message received from the vehicle controller corresponds to a CAN message (CAN message to be collected) in the collection information table.

In addition, "RAM index" in table 1 may match an index in a collection status table (second table) in which information on whether or not each vehicle data in the collection information table is collected is recorded. Here, the collection status table may be stored in a second memory (RAM) since the information on the collection status is updated in real time, and the RAM may be provided in the vehicle data collection device 20.

For example, the collection status table may be illustrated as table 2 below.

TABLE 2

|  | Index | | | | |
|---|---|---|---|---|---|
|  | 1 | 2 | 3 | 4 | 5 |
| Collection Status | O | X | O | ... | ... |

In table 2, when the collection status is "O", a CAN message corresponding to a corresponding index is currently collected, and when the collection status is "X", a CAN message corresponding to a corresponding index is not collected. Thus, indexes 1 and 3 indicate a status in which the corresponding CAN messages (0x101 and 0x3EF) are currently collected, and index 2 indicates a status in which the corresponding CAN message (0x2AB) is not collected.

In general, a reception period of a CAN message received by the vehicle data collection device 20 is faster than or equal to a collection period. When the reception period of the CAN message is faster than the collection period, the vehicle data collection device 20 may collect an arbitrary CAN message among a plurality of CAN messages received in the collection period.

For example, when a CAN message having a CAN ID of 0x101 is received in a 10 ms period, and a collection period of the corresponding CAN message is 100 ms, one of ten CAN messages received for 100 ms is collected. It may be preferable to collect a CAN message received at 10 ms, but is not limited thereto. However, if the CAN message received at 10 ms is collected, a next CAN message may be collected at 110 ms.

Since it is recorded in table 2 that the CAN message with the CAN ID of 0x101 has already been collected, it is not repeatedly collected within the corresponding period. In other words, any of second to tenth CAN messages with the CAN ID of 0x101 is not additionally collected.

For example, when a CAN message having a CAN ID of 0x2AB is received in a 100 ms period, and a collection period of the corresponding CAN message is 1 sec, one of ten CAN messages received for 1 sec is collected. It may be preferable to collect a CAN message received at 100 ms, but is not limited thereto. However, if the CAN message is collected at 100 ms, a next CAN message may be collected at 1100 ms.

Since it is recorded in table 2 that the CAN message with the CAN ID of 0x2AB has not been collected yet, it means that a current time point has not reached 100 ms.

Figure 2:
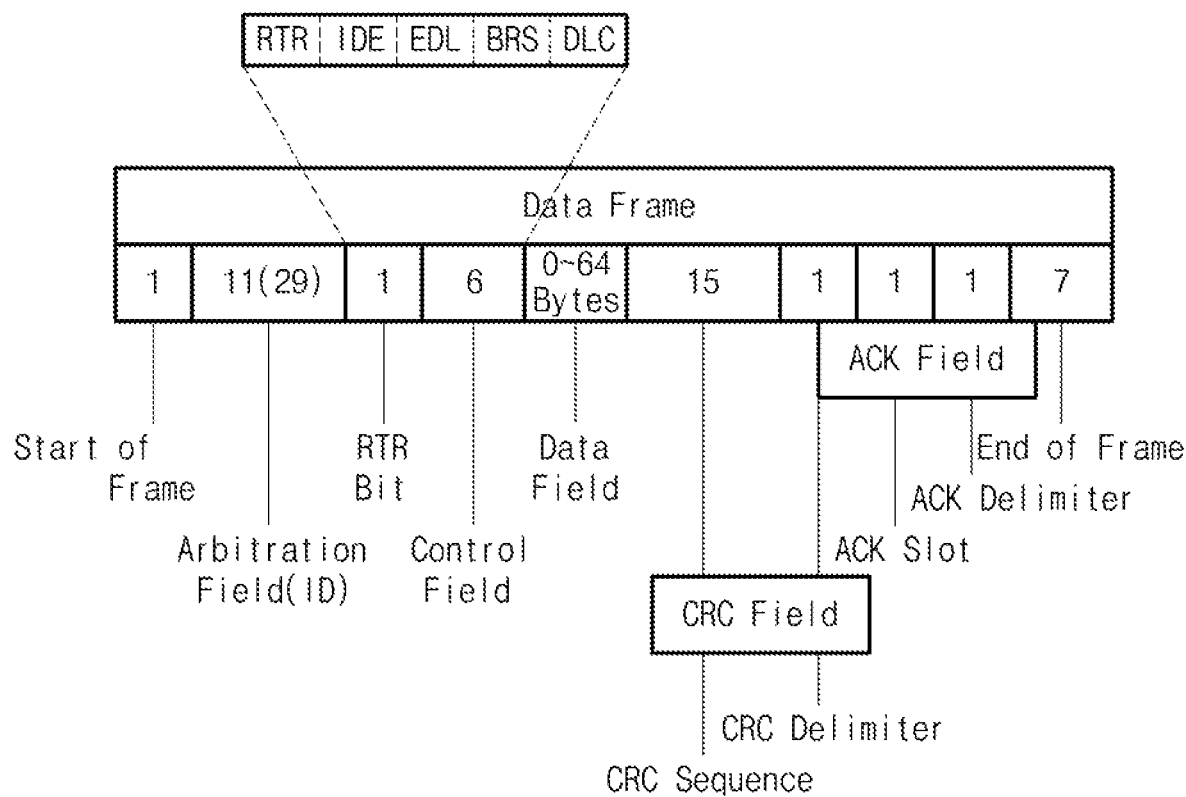
FIG. 2 illustrates a structure of a data frame for vehicle CAN communication.

For reference, the structure of the CAN message may be illustrated in FIG. 2.

FIG. 2 illustrates a structure of a data frame for vehicle CAN communication used in some forms of the present disclosure.

As illustrated in FIG. 2, the data frame for vehicle CAN communication used in some forms of the present disclosure may include SOF (Start of Frame) for notifying the start of a frame, Arbitration ID Field for insertion of arbitration ID for data priority arbitration, RTR (Remote Transmission Request) Bit for requesting data transmission of specific ID, Control Field for transmission of a control signal, Data Field in which data having a predetermined length is loaded, CRC (Cyclic Redundancy Check) Field consisting of CRC Sequence and CRC Delimiter for error detection, ACK (Acknowledgement) Field consisting of ACK Slot and ACK Delimiter for indicating the accuracy of data reception, and EOF (End of Frame).

In addition, Control Field may include IDE (Identifier Extension) for indicating whether the length of the arbitration ID is a standard (11 bits) or an extension (29 bits), and DLC (Data Length Code) for indicating a data length.

The head unit 30 may be, for example, a telematics terminal, and transmit the vehicle data collected by the vehicle data collection device 20 to the data server 40 through a wireless communication network. Here, the wireless communication network may include a mobile communication network, a wireless internet, and a local area network (LAN).

The mobile communication network may include Global System for Mobile communication (GSM), Code Division Multiple Access (CDMA), Code Division Multiple Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Teim Evolution (LTE), Long Teim Evolution-Advanced (LTEA), and the like.

The wireless internet may include Wireless LAN (WLAN), Wireless-Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like.

The local area network may include Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, Wireless Universal Serial Bus (Wireless USB), and the like.

The data server 40 may store the vehicle data received from the head unit 30 in a database. The stored vehicle data may be utilized for various vehicle services.

Figure 3:
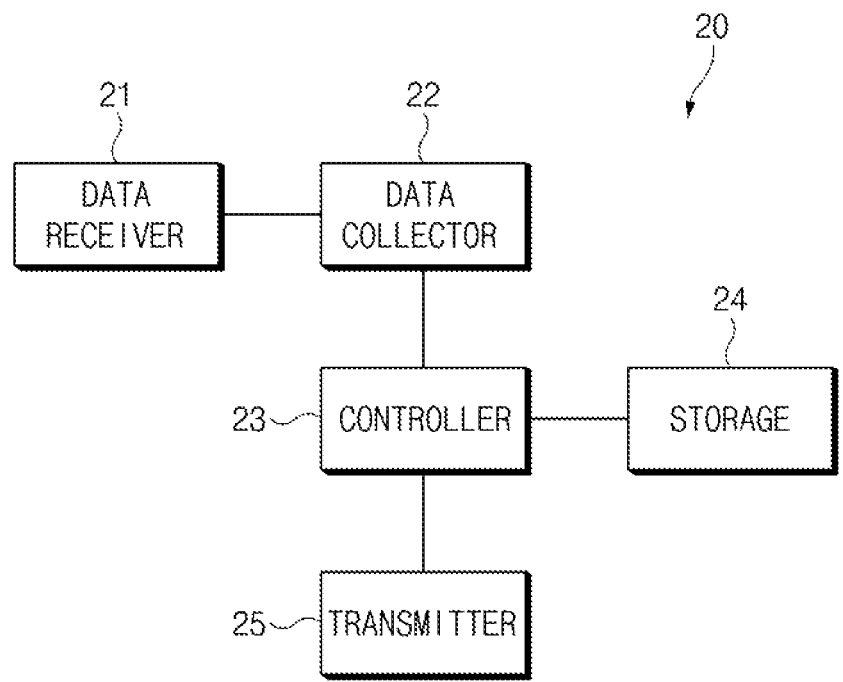
FIG. 3 illustrates the configuration of a vehicle data collection device.

FIG. 3 illustrates the configuration of a vehicle data collection device in some forms of the present disclosure.

As illustrated in FIG. 3, the vehicle data collection device 20, in some forms of the present disclosure, may include a data receiver 21, a data collector 22, a controller 23, a storage 24, and a transmitter 25. Hereinbelow, the elements will be divided by function and operations thereof will be described, but the controller 23 may alternatively be configured to control respective functions of the elements.

With regard to each of the aforementioned elements, the data receiver 21 may receive vehicle data from the ECU 10 through the vehicle network periodically.

Here, the ECU 10 may be a module that controls various electronic devices in the vehicle. Examples of electronic devices for powertrain controller area network (P-CAN) communication may include a dual automatic temperature control (DATC) module, a transmission control unit (TCU), an engine management system (EMS), and the like, and the EMS may include an engine control unit (ECU), various sensors, and various actuators. In addition, examples of electronic devices for chassis controller area network (C-CAN) communication may include a cluster (CLU) module, a yaw rate sensor (YRS), and the like. An airbag control unit (ACU) and an electronic stability control (ESC) module may be common in the powertrain-related field and the chassis-related field.

In addition, examples of electronic devices for body controller area network (B-CAN) communication may include a smart key module (SMK), a body control module (BCM), and the like, and examples of electronic devices for multimedia controller area network (M-CAN) communication may include a navigation device or various modules for interworking with other in-vehicle multimedia communication devices.

The data collector 22 may include the collection information table (first table) as illustrated in table 1 above.

In addition, the data collector 22 may collect vehicle data to be desired from the vehicle data received by the data receiver 21 based on the collection information table. In other words, the data collector 22 may collect a CAN message corresponding to a CAN ID recorded in the collection information table (first table) in a corresponding collection period. Here, the data collector 22 may determine whether or not the corresponding CAN message is collected based on the collection status table (second table). In other words, when it is recorded in the second table that the corresponding vehicle data has been collected, the data collector 22 may not collect the vehicle data.

In addition, the data collector 22 may check whether or not a CAN message received by the data receiver 21 corresponds to a CAN message (CAN message to be collected) in the collection information table using a binary search method with low complexity.

The controller 23 generally controls the aforementioned respective elements to perform the functions thereof normally.

The controller 23 may change a CAN ID field value and a collection period field value in the collection information table stored in the first memory of the data collector 22 at the user's request.

In addition, the controller 23 may control the storage 24 to store the vehicle data collected by the data collector 22. Here, the controller 23 may record "O" in a collection status field of the corresponding vehicle data in the second table, which means that the corresponding vehicle data is collected. In this manner, it may prevent the data collector 22 from repeatedly collecting the vehicle data within the corresponding period.

In addition, the controller 23 may include an overlapping code table to increase vehicle data transmission efficiency. For example, the overlapping code table may be illustrated in FIG. 4.

FIG. 4 illustrates an overlapping code table, in some forms of the present disclosure.

As illustrated in FIG. 4, the overlapping code table, in some forms of the present disclosure, may include fields of data, overlapping code, and data transmission traffic. Here, the data may consist of eight segments (32 bytes), each of which is divided in a 4-byte unit, and the overlapping code (4 bits) may include a total of 16 codes according to the degree of redundancy between previous data (data collected in a previous period) and current data (data collected in a current period).

Overlapping code 0 may be a code indicating that previous data and current data are overlapped (overlapping of all segments). Since there is no difference between the previous data and the current data and there is no need to transmit the current data, data transmission traffic may be 0.

Overlapping code 1 may be a code indicating that 0-16 bytes of previous data and 0-16 bytes of current data are overlapped (overlapping of first to fourth segments). Since only fifth to eighth segments of the current data should be transmitted, data transmission traffic may be 16 bytes.

Overlapping code 2 may be a code indicating that 16-32 bytes of previous data and 16-32 bytes of current data are overlapped (overlapping of fifth to eighth segments). Since only first to fourth segments of the current data should be transmitted, data transmission traffic may be 16 bytes.

Overlapping code 3 may be a code indicating that 0-8 bytes of previous data and 0-8 bytes of current data are overlapped (overlapping of first and second segments). Since only third to eighth segments of the current data should be transmitted, data transmission traffic may be 24 bytes.

Overlapping code 4 may be a code indicating that 8-16 bytes of previous data and 8-16 bytes of current data are overlapped (overlapping of third and fourth segments). Since only first to second segments and fifth to eighth segments of the current data should be transmitted, data transmission traffic may be 24 bytes.

Overlapping code 5 may be a code indicating that 16-24 bytes of previous data and 16-24 bytes of current data are overlapped (overlapping of fifth and sixth segments). Since only first to fourth segments and seventh to eighth segments of the current data should be transmitted, data transmission traffic may be 24 bytes.

Overlapping code 6 may be a code indicating that 24-32 bytes of previous data and 24-32 bytes of current data are overlapped (overlapping of seventh and eighth segments). Since only first to sixth segments of the current data should be transmitted, data transmission traffic may be 24 bytes.

Overlapping code 7 may be a code indicating that 0-4 bytes of previous data and 0-4 bytes of current data are overlapped (overlapping of first segment). Since only second to eighth segments of the current data should be transmitted, data transmission traffic may be 28 bytes.

Overlapping code 8 may be a code indicating that 4-8 bytes of previous data and 4-8 bytes of current data are overlapped (overlapping of second segment). Since only first segment and third to eighth segments of the current data should be transmitted, data transmission traffic may be 28 bytes.

Overlapping code 9 may be a code indicating that 8-12 bytes of previous data and 8-12 bytes of current data are overlapped (overlapping of third segment). Since only first to second segments and fourth to eighth segments of the current data should be transmitted, data transmission traffic may be 28 bytes.

Overlapping code 10 may be a code indicating that 12-16 bytes of previous data and 12-16 bytes of current data are overlapped (overlapping of fourth segment). Since only first to third segments and fifth to eighth segments of the current data should be transmitted, data transmission traffic may be 28 bytes.

Overlapping code 11 may be a code indicating that 16-20 bytes of previous data and 16-20 bytes of current data are overlapped (overlapping of fifth segment). Since only first to fourth segments and sixth to eighth segments of the current data should be transmitted, data transmission traffic may be 28 bytes.

Overlapping code 12 may be a code indicating that 20-24 bytes of previous data and 20-24 bytes of current data are overlapped (overlapping of sixth segment). Since only first to fifth segments and seventh to eighth segments of the current data should be transmitted, data transmission traffic may be 28 bytes.

Overlapping code 13 may be a code indicating that 24-28 bytes of previous data and 24-28 bytes of current data are overlapped (overlapping of seventh segment). Since only first to sixth segments and eighth segment of the current data should be transmitted, data transmission traffic may be 28 bytes.

Overlapping code 14 may be a code indicating that 28-32 bytes of previous data and 28-32 bytes of current data are overlapped (overlapping of eighth segment). Since only first to seventh segments of the current data should be transmitted, data transmission traffic may be 28 bytes.

Overlapping code 15 may be a code indicating that previous data and current data are not overlapped (non-overlapping of all segments). Since all segments of the current data should be transmitted, data transmission traffic may be 32 bytes.

In addition, the controller 23 may control the transmitter 25 to transmit the vehicle data based on the overlapping code table.

After the vehicle data is transmitted, the controller 23 may change a field value corresponding to the vehicle data to "X" in the collection status field of the corresponding vehicle data in the second table. This is intended to allow the data collector 22 to collect new vehicle data only once for each period.

The storage 24 may be a buffer that stores the vehicle data collected for each period. For example, the storage 24 may store the vehicle data as illustrated in table 3 below.

TABLE 3

| 100 ms | 0x101 Data | ... | ... |
| 1 sec  | 0x2AB Data | ... | ... |
| 1 min  | 0x3EF Data | ... | ... |
| ...    | ...        | ... | ... |

The storage 24 may include at least one storage medium selected from among a flash memory, a hard disk, a solid status disk (SSD), a silicon disk drive (SDD), a multimedia card micro type memory, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The transmitter 25 may transmit the vehicle data received from the controller 23 to the head unit 30 based on the CAN communication or the Ethernet communication. The transmitter 25 may also transmit the vehicle data to the data server 40, a service server (not shown), or the like through the Internet.

Figure 5:
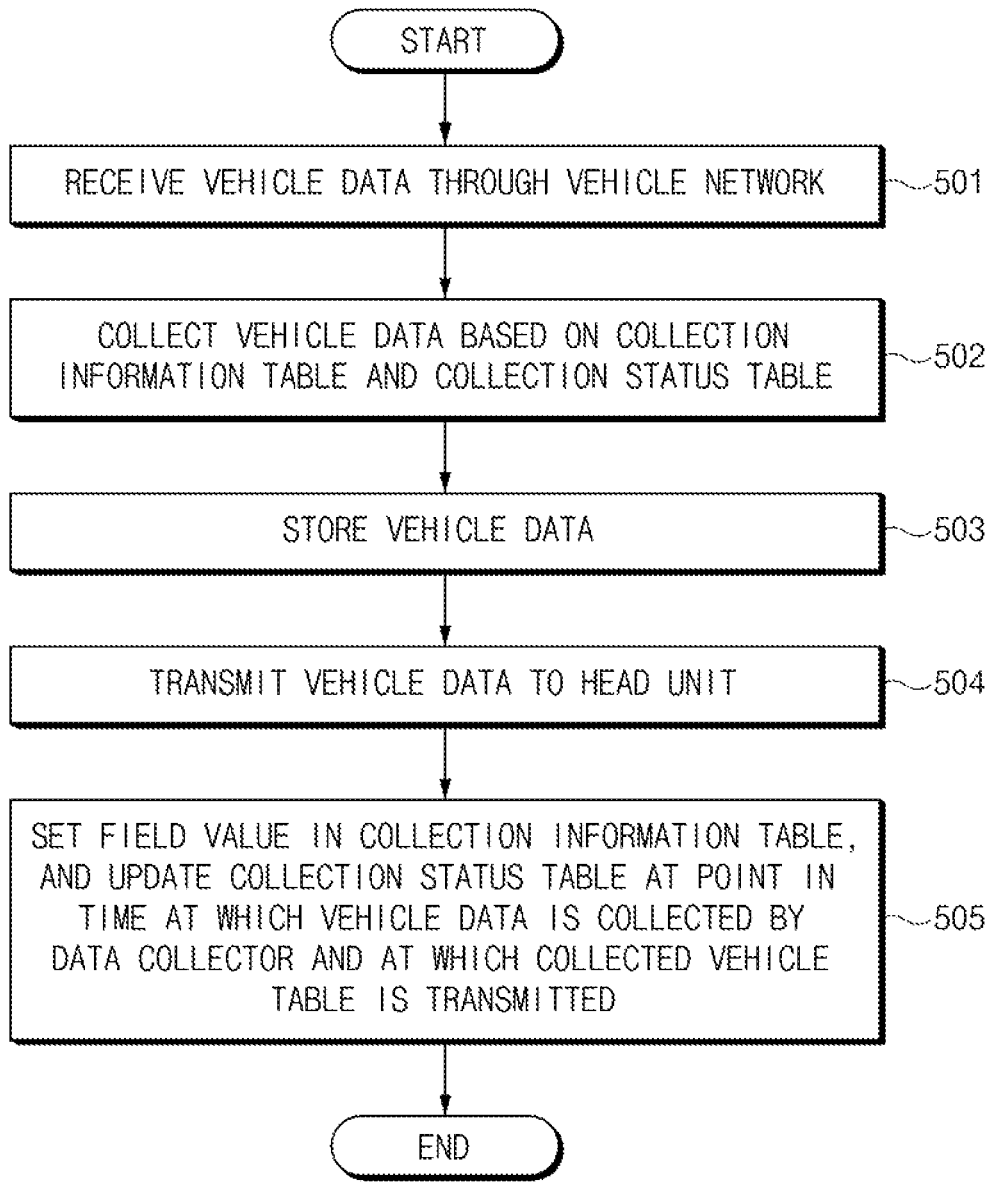
FIG. 5 illustrates a flowchart of a vehicle data collection method.

FIG. 5 illustrates a vehicle data collection method, in some forms of the present disclosure.

First of all, the data receiver 21 may receive vehicle data through a vehicle network in step 501.

Next, the data collector 22 may collect the vehicle data based on a collection information table and a collection status table in step 502.

Thereafter, the storage 24 may store the collected vehicle data under the control of the controller 23 in step 503.

Then, the transmitter 25 may transmit the collected vehicle data to the head unit under the control of the controller 23 in step 504. Here, the transmitter 25 may also transmit the vehicle data stored in the storage 24.

Thereafter, the controller 23 may set field values in the collection information table, and update the collection status table at a point in time at which the vehicle data is collected by the data collector 22 and at which the collected vehicle data is transmitted to the head unit in step 505.

As set forth above, the vehicle data collection device and method, in some forms of the present disclosure, may be capable of collecting each vehicle data set by the user among vehicle data received from each vehicle controller through the vehicle network within a corresponding period (collection period set for each vehicle data), and recording whether or not each vehicle data is collected in real time, thereby preventing overlapping collection of the vehicle data within the corresponding period.

In addition, after the collected vehicle data is transmitted to the head unit in the corresponding period, information on whether or not each vehicle data is transmitted (after the transmission of each vehicle data, the corresponding vehicle data is recorded as "X" indicating "not collected") may be recorded in real time. In this manner, new vehicle data may be efficiently collected for each period.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle data collection device, the device comprising:
   a data receiver configured to receive vehicle data through a vehicle network;
   a data collector configured to collect the vehicle data based on a collection information table and a collection status table;
   a storage configured to store the vehicle data;
   a controller configured to:
      set a field value in the collection information table; and
      update the collection status table when the data collector collects the vehicle data and when the vehicle data is transmitted; and
   a transmitter configured to transmit the vehicle data to a head unit,
   wherein the controller is further configured to:
      record "O" in a collection status field of the collection status table when the data collector collects the vehicle data; and
      record "X" in the collection status field of the collection status table when the vehicle data is transmitted to the head unit.

2. The device of claim 1, wherein:
   the data collector is configured to collect a Controller Area Network (CAN) message for a collection period, wherein the CAN message corresponds to a CAN ID recorded in the collection information table.

3. The device of claim 2, wherein:
   the data collector is configured to check with a binary search method whether a CAN message including the vehicle data corresponds to a CAN message in the collection information table.

4. The device of claim 2, wherein:
   the data collector is configured to determine whether to collect the CAN message based on the collection status table.

5. The device of claim 1, wherein:
the controller is configured to change the field value regarding a CAN ID and a collection period in the collection information table at a user's request.

6. The device of claim 1, wherein:
the controller is configured to control the transmitter such that the transmitter transmits the vehicle data based on an overlapping code table.

7. The device of claim 6, wherein the overlapping code table comprises:
an overlapping segment between vehicle data collected in a previous period and vehicle data collected in a current period; and
an overlapping code corresponding to each overlapping segment.

8. The device of claim 7, wherein the controller is configured to control the transmitter such that the transmitter transmits vehicle data except for the overlapping segment, and transmits the overlapping code.

9. The device of claim 1, wherein the storage is configured to store the vehicle data for each collection period.

10. A vehicle data collection method, the method comprising:
receiving vehicle data through a vehicle network;
collecting the vehicle data based on a collection information table and a collection status table;
storing the vehicle data;
transmitting the vehicle data to a head unit;
setting a field value in the collection information table; and
updating the collection status table when a data collector collects the vehicle data and when the vehicle table is transmitted to the head unit,
wherein updating the collection status table further comprises:
recording "O" in a collection status field of the collection status table when the data collector collects the vehicle data; and
recording "X" in the collection status field of the collection status table when the vehicle data is transmitted to the head unit.

11. The method of claim 10, wherein collecting the vehicle data based on the collection information table and the collection status table comprises:
collecting a Controller Area Network (CAN) message for a collection period, wherein the CAN message corresponds to a CAN ID recorded in the collection information table.

12. The method of claim 11, wherein collecting the vehicle data based on the collection information table and the collection status table comprises:
checking with a binary search method whether a CAN message including the vehicle data corresponds to a CAN message in the collection information table.

13. The method of claim 11, wherein collecting the vehicle data based on the collection information table and the collection status table comprises:
determining whether to collect the CAN message based on the collection status table.

14. The method of claim 10, wherein setting the field value in the collection information table comprises:
changing the field value regarding a CAN ID and a collection period in the collection information table at a user's request.

15. The method of claim 10, wherein transmitting the vehicle data to the head unit comprises:
transmitting the vehicle data based on an overlapping code table.

16. The method of claim 15, wherein the overlapping code table comprises:
an overlapping segment between vehicle data collected in a previous period and vehicle data collected in a current period; and
an overlapping code corresponding to each overlapping segment.

17. The method of claim 16, wherein transmitting the vehicle data to the head unit comprises:
transmitting vehicle data except for the overlapping segment, and transmitting the overlapping code.

18. The method of claim 10, wherein storing the vehicle data comprises:
storing the vehicle data for each collection period.

* * * * *